US009723502B2

(12) United States Patent
Gupta et al.

(10) Patent No.: US 9,723,502 B2
(45) Date of Patent: *Aug. 1, 2017

(54) DETECTING CELLULAR CONNECTIVITY ISSUES IN A WIRELESS COMMUNICATION NETWORK

(71) Applicant: International Business Machines Corporation, Armonk, NY (US)

(72) Inventors: Parul Gupta, Bangalore Karnataka (IN); Shivkumar Kalyanaraman, Vibhutipura (IN); Ravindranath Kokku, Hyderabad (IN); Vinay Kumar Kolar, Bangalore (IN); Ramya Raghavendra, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/265,924

(22) Filed: Sep. 15, 2016

(65) Prior Publication Data
US 2017/0006486 A1    Jan. 5, 2017

Related U.S. Application Data

(63) Continuation of application No. 14/266,082, filed on Apr. 30, 2014.

(51) Int. Cl.
*H04W 24/08* (2009.01)
*H04M 15/00* (2006.01)
(Continued)

(52) U.S. Cl.
CPC .......... *H04W 24/08* (2013.01); *H04M 3/085* (2013.01); *H04M 3/2218* (2013.01);
(Continued)

(58) Field of Classification Search
CPC ...... H04M 15/00; H04M 15/41; H04M 15/58; H04M 2215/0164; H04M 2215/0188;
(Continued)

(56) References Cited

U.S. PATENT DOCUMENTS 5,561,841 A    10/1996  Markus
5,920,607 A     7/1999  Berg .................... H04W 24/00
                                                               370/241
(Continued)

FOREIGN PATENT DOCUMENTS

EP           1303121 A1    4/2003
EP           14654446     10/2004
(Continued)

OTHER PUBLICATIONS

List of IBM Patents or Patent Applications Treated as Related.
(Continued)

*Primary Examiner* — Matthew Sams
(74) *Attorney, Agent, or Firm* — Fleit Gibbons Gutman; Bongini Bianco PL; Thomas S. Grzesik (57) ABSTRACT

Various embodiments manage service issues in a wireless communication network. In one embodiment, a plurality of call detail records associated with a wireless communication network is received. The plurality of call detail records is analyzed. At least one pattern from the plurality of call detail records is identified based on analyzing the plurality of call detail records. The at least one pattern indicates at least one service issue occurred during a set of calls associated with each of the plurality of call detail records. A location associated with the at least one service issue that has occurred is identified based on identifying the at least one pattern.

13 Claims, 4 Drawing Sheets

(51) Int. Cl.
*H04W 8/18* (2009.01)
*H04M 3/08* (2006.01)
*H04M 3/22* (2006.01)

(52) U.S. Cl.
CPC ......... *H04M 3/2227* (2013.01); *H04M 15/41* (2013.01); *H04M 15/61* (2013.01); *H04W 8/18* (2013.01); *H04M 15/58* (2013.01); *H04M 15/70* (2013.01); *H04M 2215/0164* (2013.01)

(58) Field of Classification Search
CPC .... H04M 3/36; H04M 15/85; H04M 2215/81; H04M 2215/815; H04M 15/43; H04M 15/8038; H04M 2215/52; H04W 24/08; H04W 76/027
See application file for complete search history.

(56) References Cited

U.S. PATENT DOCUMENTS

| | | | |
|---|---|---|---|
| 6,298,123 B1 | 10/2001 | Nolting et al. | |
| 6,317,599 B1 | 11/2001 | Rappaport et al. | |
| 6,336,035 B1 | 1/2002 | Somoza et al. | |
| 6,970,542 B2 | 11/2005 | Moisey et al. | |
| 6,985,731 B1 | 1/2006 | Johnson et al. | |
| 7,043,661 B2 | 5/2006 | Valadarsky et al. | |
| 7,246,045 B1 | 7/2007 | Rappaport et al. | |
| 7,475,003 B1 | 1/2009 | Madhusudhana et al. | |
| 7,555,261 B2 | 6/2009 | O'Neill | |
| 7,609,826 B2 | 10/2009 | Liu .................... | H04M 15/00 379/114.14 |
| 8,131,300 B2 | 3/2012 | Sartori et al. | |
| 8,135,414 B2 | 3/2012 | Khokhar | |
| 8,229,163 B2 | 7/2012 | Coleman et al. | |
| 8,369,230 B1 | 2/2013 | Croak et al. | |
| 8,391,836 B1 | 3/2013 | Bolot et al. | |
| 8,406,398 B2 | 3/2013 | Gore | |
| 8,634,527 B2 | 1/2014 | Chung ................ | H04M 15/00 379/114.04 |
| 8,861,691 B1 | 10/2014 | De et al. | |
| 8,913,622 B2 | 12/2014 | Majd .................. | H04L 12/2856 370/252 |
| 9,320,006 B2 | 4/2016 | Schuler ............... | H04W 64/00 |
| 2002/0083166 A1 | 6/2002 | Dugan et al. | |
| 2002/0107634 A1 | 8/2002 | Luciani | |
| 2005/0107095 A1 | 5/2005 | Samuel | |
| 2005/0262106 A1 | 11/2005 | Enqvist | |
| 2006/0141983 A1 | 6/2006 | Jagannathan ...... | G06Q 30/0283 455/406 |
| 2006/0274703 A1 | 12/2006 | Connelly ........... | H04L 41/0622 370/338 |
| 2006/0293025 A1 | 12/2006 | Chiou et al. | |
| 2007/0035390 A1 | 2/2007 | Thomas ............... | H04W 8/245 340/539.11 |
| 2007/0153807 A1 | 7/2007 | Cruz et al. | |
| 2007/0191010 A1 | 8/2007 | Kim .................... | H04W 76/02 455/436 |
| 2008/0019493 A1 | 1/2008 | Kreckel et al. | |
| 2008/0046306 A1 | 2/2008 | Egner ................. | G06Q 10/0637 |
| 2008/0288427 A1 | 11/2008 | Barson et al. | |
| 2009/0067423 A1 | 3/2009 | Visser | |
| 2009/0207741 A1 | 8/2009 | Takahashi ............ | H04L 41/12 370/242 |
| 2009/0304165 A1 | 12/2009 | Chung ................. | H04M 3/36 379/112.06 |
| 2009/0318132 A1 | 12/2009 | Chiou ................. | H04W 24/08 455/423 |
| 2010/0135476 A1 | 6/2010 | Paden et al. | |
| 2010/0144367 A1 | 6/2010 | Goh et al. | |
| 2010/0167722 A1 | 7/2010 | Madhavan .......... | H04W 76/027 456/426.2 |
| 2010/0261449 A1 | 10/2010 | Mishkin | |
| 2010/0312612 A1 | 12/2010 | Carr et al. | |
| 2011/0184961 A1 | 7/2011 | Aertebjerg et al. | |
| 2011/0212721 A1 | 9/2011 | Chang ................. | H04M 15/00 455/433 |
| 2011/0295577 A1 | 12/2011 | Ramachandran | |
| 2012/0115505 A1 | 5/2012 | Miyake et al. | |
| 2012/0163225 A1 | 6/2012 | Mishkin et al. | |
| 2012/0178413 A1 | 7/2012 | Schliesser et al. | |
| 2012/0221232 A1 | 8/2012 | Shang et al. | |
| 2012/0231781 A1 | 9/2012 | Kumar et al. | |
| 2012/0270561 A1 | 10/2012 | Giustina et al. | |
| 2012/0284080 A1 | 11/2012 | De Oliveira et al. | |
| 2012/0303413 A1 | 11/2012 | Wang et al. | |
| 2013/0053055 A1 | 2/2013 | Kumar | |
| 2013/0095817 A1 | 4/2013 | Karla et al. | |
| 2013/0095880 A1 | 4/2013 | Tzamaloukas | |
| 2013/0183996 A1 | 7/2013 | Scarr et al. | |
| 2014/0128058 A1* | 5/2014 | Ji ........................ | H04W 76/028 455/423 |
| 2014/0192676 A1 | 7/2014 | Sullivan | |
| 2014/0211785 A1 | 7/2014 | Majd .................. | H04L 12/2856 370/352 |
| 2015/0004999 A1 | 1/2015 | Schuler ................ | H04W 64/00 455/456.1 |
| 2015/0319605 A1* | 11/2015 | Gupta .................. | H04M 15/61 455/405 |

FOREIGN PATENT DOCUMENTS

| | | |
|---|---|---|
| EP | 2431155 A1 | 3/2012 |
| EP | 2432155 | 3/2012 |
| EP | 2521288 | 7/2012 |
| WO | 9723085 | 6/1997 |

OTHER PUBLICATIONS

Final Office Action dated Apr. 8, 2016 received for U.S. Appl. No. 14/230,044.
Non-Final Office Action dated May 6, 2016, received for U.S. Appl. No. 15/086,219.
Final Office Action dated Feb. 2, 2016 received for U.S. Appl. No. 14/258,676.
Non-Final Office Action dated Aug. 13, 2015, received for U.S. Appl. No. 14/258,676.
Non-Final Office Action dated Aug. 31, 2015, received for U.S. Appl. No. 14/230,044.
Non-Final Office Action dated Sep. 25, 2015, received for U.S. Appl. No. 14/258,598.
Hohwald, H., et al., "User Modeling for Telecommunication Applications: Experiences and Practical Implications," User Modeling, Adaption and Personalization, Proceedings 18th International Conference, Digital Object Identifier: 10.1007/978-3-642-13470-8_30, Jun. 20-24, 2010, pp. 327-338.
Zhang, H., et at. "Change Point Detection based on Call Detail Records," ISI 2009, Jun. 2009, pp. 55-60, 978-1-4244-4173-0/09/ $25.00, Copyright 2009 IEEE.
Kavulya, S., et al., "Draco: Top Down Statistical Diagnosis of Large-Scale VoIP Networks," Apr. 2011, Parallel Data Laboratory, Carnegie Mellon University, AT&T Lab—Research, CMU-PDL-11-109.
Fiadino, P., et al, "Steps towards the Extraction of Vehicular Mobility Patterns from 3G Signaling Data," TMA 2012, LNCS 7189, Mar. 2012, pp. 66-80, copyright Springer-Verlag Verlin Heidelberg 2012.
Tzavidas, S., et al., "Channel Mesurement-Based Backup of Control Information in Distributed Cellular Architectures," Aug. 17, 2005, pp. 1-5, IPCOM00127010D, Copyright Motorola, Inc. Aug. 17, 2005.
Wang, H., et al., "Transportation Mode Inference from Anonymized and Aggregated Mobile Phone Call Detail Records," Intelligent Transportation Systems (ITSC), 2010 13th International IEEE Conference on Digital Object Identifier: 10/1109/ITSC.2010.5625188, Publication Year: 2010, pp. 318-323.
Hohwald, H., et al., "User Modeling for Telecommunication Applications: Experiences and Practical Implications," User Modeling, (56) References Cited

OTHER PUBLICATIONS

Adoption and Personalization, Proceedings 18th International Conference, Digital Object Identifier: 10.1007/978-3-642-13470-8_30, Jun. 20-24, 2010, pp. 327-338.

* cited by examiner

FIG. 1

| SOURCE ADDR | DEST ADDR | DURATION | CALL VOL | TERM CODE | ... | SRC CELL SITE ID | DEST CELL SITE ID | SGSN ID | GGSN ID | CDR ID | TIME STAMP |
|---|---|---|---|---|---|---|---|---|---|---|---|
| UE_1 | UE_A | DUR_1 | VOL_1 | N/A | ... | SITE_1 | SITE_A | SGSN_1 | GGSN_1 | CDR_1 | TS_1 |
| UE_2 | UE_B | DUR_2 | VOL_2 | N/A | ... | SITE_1 | SITE_B | SGSN_1 | GGSN_1 | CDR_2 | TS_2 |
| ... | ... | ... | ... | ... | ... | ... | ... | ... | ... | ... | ... |
| UE_N | UE_Y | DUR_N | VOL_N | CODE_N | ... | SITE_N | SITE_C | SGSN_N | GGSN_N | CDR_N | TS_N |

DETECTING CELLULAR CONNECTIVITY ISSUES IN A WIRELESS COMMUNICATION NETWORK

BACKGROUND

The present invention generally relates to wireless communication networks, and more particularly relates to detecting cellular connectivity issues based on call detail records.

Maintaining satisfactory cellular connectivity is an important goal for cellular network operators. Network operators generally identify connectivity problems or quality based on field tests during deployment and/or customer complaints during system operation. However, these methods of monitoring cellular connectivity are generally unacceptable for environments, such as urban environments, with challenging physical structures (e.g., large and high-rise buildings). For example, field tests generally cannot provide complete coverage of an urban area since these areas are dense, and the connectivity may vary in different floors of a building. Also, new buildings get constructed and change the signal profile, thereby creating new patterns of call quality degradation. In addition, waiting until customers raise complaints is undesirable since many customers will change providers instead of complaining.

BRIEF SUMMARY

In one embodiment, a method for managing service issues in a wireless communication network is disclosed. The method comprises receiving a plurality of call detail records associated with a wireless communication network. The plurality of call detail records is analyzed. At least one pattern from the plurality of call detail records is identified based on analyzing the plurality of call detail records. The at least one pattern indicates at least one service issue occurred during a set of calls associated with each of the plurality of call detail records. A location associated with the at least one service issue that has occurred is identified based on identifying the at least one pattern.

In another embodiment, a computer program storage product for managing service issues in a wireless communication network is disclosed. The computer program storage product comprises instructions configured to perform a method. The method comprises receiving a plurality of call detail records associated with a wireless communication network. The plurality of call detail records is analyzed. At least one pattern from the plurality of call detail records is identified based on analyzing the plurality of call detail records. The at least one pattern indicates at least one service issue occurred during a set of calls associated with each of the plurality of call detail records. A location associated with the at least one service issue that has occurred is identified based on identifying the at least one pattern.

In another embodiment, an information processing system for managing service issues in a wireless communication network is disclosed. The information processing system comprises memory and a processor that is communicatively coupled to the memory. A network monitoring system is communicatively coupled to the memory and the processor. The network monitoring system is configured to perform a method. The method comprises receiving a plurality of call detail records associated with a wireless communication network. The plurality of call detail records is analyzed. At least one pattern from the plurality of call detail records is identified based on analyzing the plurality of call detail records. The at least one pattern indicates at least one service issue occurred during a set of calls associated with each of the plurality of call detail records. A location associated with the at least one service issue that has occurred is identified based on identifying the at least one pattern.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Operating Environment

Figure 1:
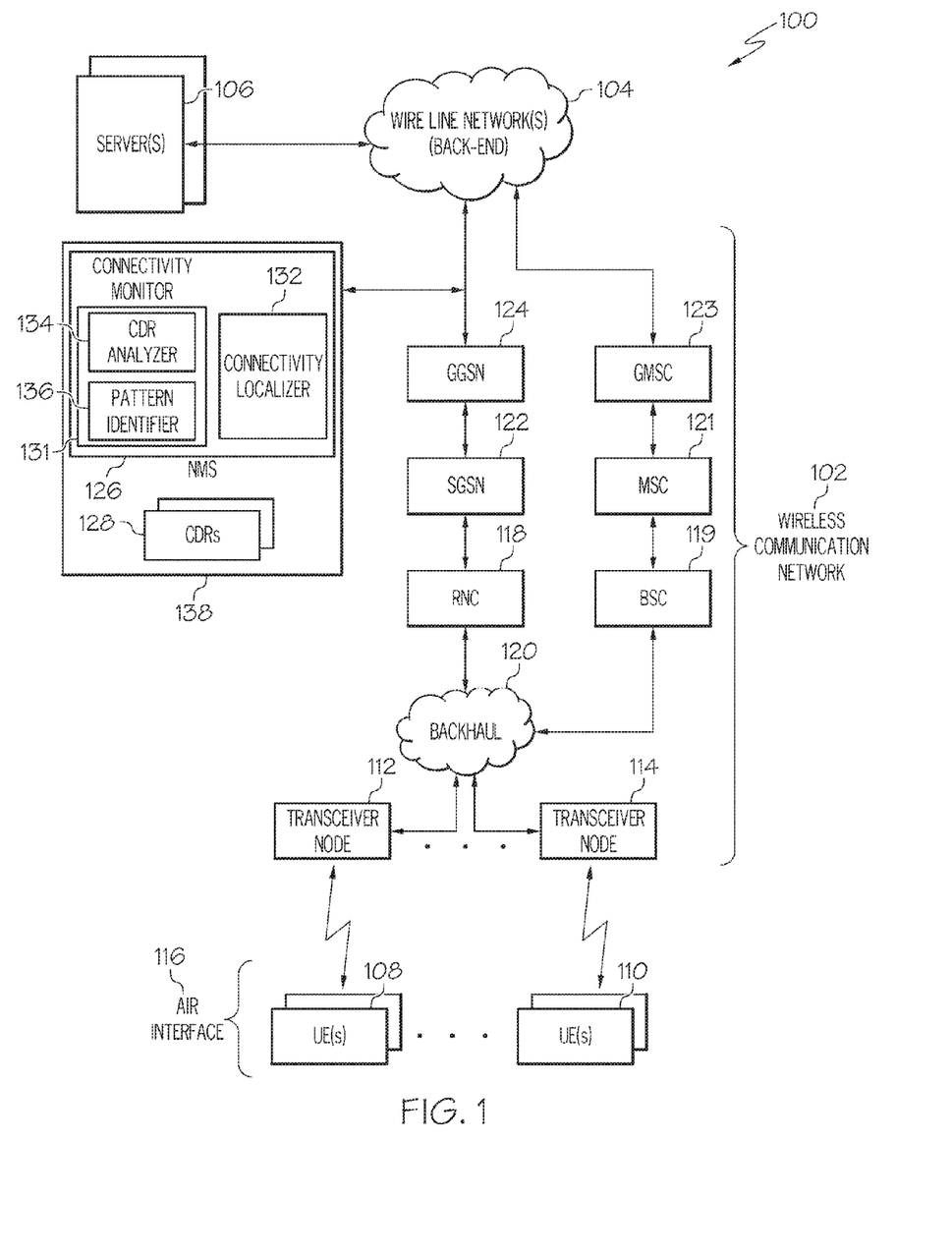
FIG. 1 is a block diagram illustrating one example of an operating environment according to one embodiment of the present invention.

FIG. 1 shows an operating environment 100 according to one embodiment of the present invention. The operating environment 100 comprises one or more wireless communication networks 102 that are communicatively coupled to one or more wire line networks 104. For purposes of simplicity, only the portions of these networks that are relevant to embodiments of the present invention are described. The wire line network 104 acts as a back-end for the wireless communication network 102. In this embodiment, the wire line network 104 comprises one or more access/core networks of the wireless communication network 102 and one or more Internet Protocol (IP) networks such as the Internet. The wire line network 104 communicatively couples one or more servers 106 such as (but not limited to) content sources/providers to the wireless communication network 102. In further embodiments, the back-end is not a wire line network. For example, the back-end takes the form of a network of peers in which a mobile base station/cell site (e.g., eNode B in the case of GSM and its descendants) is itself used as a back-end network for other base stations.

The wireless communication network 102 supports any wireless communication standard such as, but not limited to, Global System for Mobile Communications (GSM), Code Division Multiple Access (CDMA), Time Division Multiple Access (TDMA), General Packet Radio Service (GPRS), Frequency Division Multiple Access (FDMA), Orthogonal Frequency Division Multiplexing (OFDM), or the like. The wireless communication network 102 includes one or more networks based on such standards. For example, in one embodiment, the wireless communication network 102 comprises one or more of a Long Term Evolution (LTE) network, LTE Advanced (LTE-A) network, an Evolution Data Only (EV-DO) network, a GPRS network, a Universal Mobile Telecommunications System (UMTS) network, and the like.

FIG. 1 further shows that one or more user devices (also referred to herein as "user equipment (UE)") 108, 110 are communicatively coupled to the wireless communication network 102. The UE devices 108, 110, in this embodiment, are wireless communication devices such as two-way radios, cellular telephones, mobile phones, smartphones, two-way pagers, wireless messaging devices, laptop computers, tablet computers, desktop computers, personal digital assistants, and other similar devices. UE devices 108, 110 access the wireless communication network 102 through one or more transceiver nodes 112, 114 using one or more air interfaces 116 established between the UE devices 108, 110 and the transceiver node 112, 114.

In another embodiment, one or more UE devices 108, 110 access the wireless communication network 102 via a wired network and/or a non-cellular wireless network such as, but not limited to, a Wireless Fidelity (WiFi) network. For example, the UE devices 108, 110 can be communicatively coupled to one or more gateway devices via wired and/or wireless mechanisms that communicatively couples the UE devices 108, 110 to the wireless communication network 102. This gateway device(s), in this embodiment, communicates with the wireless communication network 102 via wired and/or wireless communication mechanisms.

The UE devices 108, 110 interact with the wireless communication network 102 to send/receive voice and data communications to/from the wireless communication network 104. For example, the UE devices 108, 110 are able to wirelessly request and receive content (e.g., audio, video, text, web pages, etc.) from a provider, such as the server 106, through the wireless communication network 102. The requested content/service is delivered to the wireless communication network 102 through the wire line network 104.

A transceiver node 112, 114 is known as a base transceiver station (BTS), a Node B, and/or an Evolved Node B (eNode B) depending on the technology being implemented within the wireless communication network 104. Throughout this discussion a transceiver node 112, 114 is also referred to as a "base station". The base station 112, 114 is communicatively coupled to one or more antennas and a radio network controller (RNC) 118 and/or base station controller (BSC) 119, which manages and controls one or more base station 112, 114. It should be noted that in a 4G LTE network, the eNodeB communicates directly with the core of the cellular network.

The RNC 118 and/or BSC 119 can be included within or separate from a base station 112, 114. The base stations 112, 114 communicate with the RNC 118 over a backhaul link 120. In the current example, a base station 112, 114 is communicatively coupled to a Serving GPRS (SGSN) 122, which supports several RNCs 118. The SGSN 122 is communicatively coupled to Gateway GPRS Support Node (GGSN) 124, which communicates with the operator's service network (not shown). The operator's service network connects to the Internet at a peering point. It should be noted that even though UMTS components are illustrated in FIG. 1 embodiments of the present invention are applicable to other wireless communication technologies as well.

In another example, the base stations 112, 114 communicate with the BSC 119 over the backhaul link 120. In this example, a base station 112, 114 is communicatively coupled to a mobile switching center (MSC) 121, which supports several BSCs 119. The MSC 121 performs the same functions as the SGSN 122 for voice traffic, as compared to packet switched data. The MSC 121 and SGSN 122 can be co-located. The MSC 121 is communicatively coupled to a gateway mobile switching center (GMSC) 123, which routes calls outside the mobile network.

In one example, the communication protocols between the UE devices 108, 110 and the GGSN 124 are various 3rd Generation Partnership Project (3GPP) protocols over which the internet protocol (IP) traffic from the UE devices 108, 110 is tunneled. For example, a GPRS tunneling protocol (GTP) is utilized between the RNC 118 and the GGSN 124. A standard Internet Protocol (IP) is utilized between the GGSN 124 and the wire line network 104. The server(s) 106 has a TCP (Transmission Control Protocol) socket that communicates with a TCP socket at the UE devices 108, 110 when a user wishes to access data from the server 106. An IP tunnel is created from the GGSN 124 to UE devices 108, 110 for user traffic and passes through the interim components, such as the RNC 118 and the SGSN 122.

A network monitoring system (NMS) 126, in one embodiment, is implemented within or communicatively coupled to the wireless communication network 102. The NMS 126 is configured to detect and identify service issues such as (but not limited to) connectivity problems within the network 102 based on call detail records (CDRs) 128, also referred to as "charging data records" or "call data records". The NMS 126 is also configured to localize the connectivity problems once identified. Once a connectivity problem is localized, the NMS 126 stores location information 130 associated with the identified connection problem(s). Utilizing CDRs 128 to identify connectivity issues is advantageous since conventional testing techniques generally fail to provide adequate coverage for many environments such as (but not limited to) urban environments comprising large buildings.

The NMS 126, in one embodiment, comprises a connectivity monitor 131 and a connectivity localizer 132. The connectivity monitor 131 comprises a CDR analyzer 134 and a pattern identifier 136. The NMS 126 and its components are discussed in greater detail below. In one embodiment, the NMS 126 is located within one or more servers 138. In other embodiments, the NMS 126 (or at least one of its components) resides at the source of the CDRs 128 (e.g., the MSC 121 and/or the SGSN 122). The server 138, in one embodiment, is a datacenter that receives CDRs 128 from a network element such as the MSC 121 and/or the SGSN 122 for billing purposes. The server 138, in on embodiment, stores CDRs 128 for a given period of time. Stated differently, the server 138 stores and maintains historical CDR data for a given amount of time. In addition to CDR data, the server 138 can also include other information such as records of user addresses, user billing plans, etc.

Detection and Localization of Connectivity Issues

As discussed above, detecting cellular connectivity problems within a wireless communication network can be problematic, especially in urban environments comprising large buildings. These buildings typically host a large number of a network operator's customers, and different customers perceive different call qualities at different locations (such as floors or rooms of the buildings). However, one or more embodiments utilize a combination of CDRs and localization techniques to identify problems when they happen, and aid the network operator to fix the problems proactively. Utilizing CDRs ensures that problems can be identified as soon as they appear, even as buildings and their environments evolve. For example, the NMS 126, in one embodiment, utilizes CDRs 128 collected for billing purposes to connectivity issues/problems within the network 102. The NMS 126 also identifies the specific geographical areas experiencing the connectivity issues/problems. In an urban environment comprising multiple buildings the NMS 126 is able to proactively identify the buildings where planned network growth or network adjustment is required.

In one embodiment, the NMS 126 obtains a plurality of CDRs 128 generated by, for example, the MSC 121 and/or the SGSN 122. The NMS 126, in one embodiment, is configured to obtain CDRs 128 at predefined intervals. However, the NMS 126 can also obtain CDRs 128 as they are generated. A CDR 128 is a formatted measure of a UE's service usage information (placing a phone call, accessing the Internet, etc.). For example, a CDR 128 includes information related to a telephone voice or data call such as (but not limited to) the origination and destination addresses of the call; the time the call started and ended; the duration of the call; the time of day the call was made; call termination and error codes; and other details of the call. A CDR 128 also comprises some (partial) information about which network elements handled the particular call including, but not limited to, source cell site identifiers and destination cell site identifiers. A CDR 128 is typically generated by one or more network functions that supervise, monitor, and/or control network access for the device, such as the MSC 121 for voice calls and the SGSN 122 for data calls.

Figure 2:
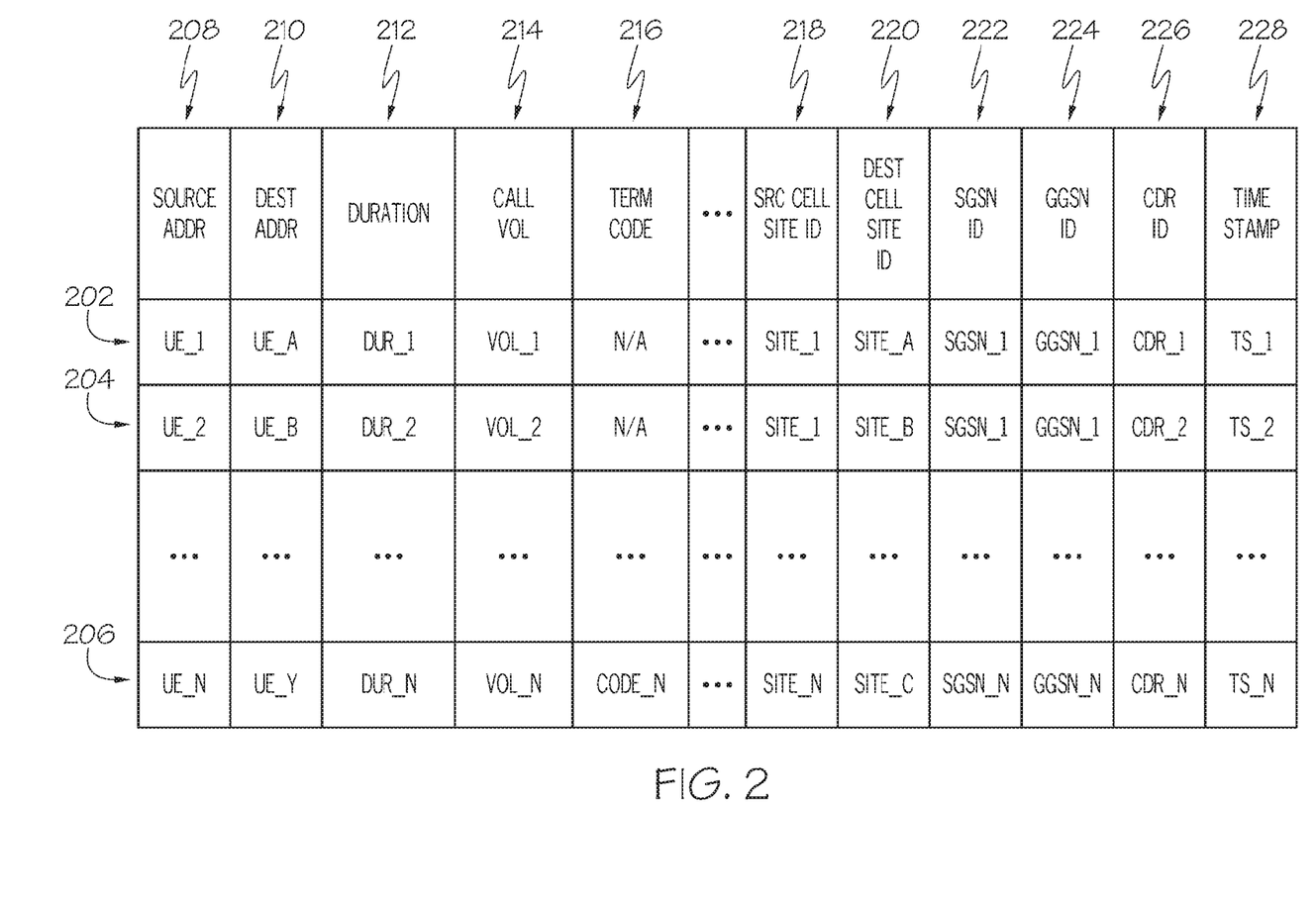
FIG. 2 illustrates various examples of call detail records according to one embodiment of the present invention.

FIG. 2 shows various examples of CDR records. In the example of FIG. 2 each row 202, 204, 206 corresponds to a separate CDR. In this example, each CDR 202, 204, 206 comprises entries identifying flow information such as (but not limited to) the source/origination address 208 of the call; the destination address 210 of the call; temporal information 212 (e.g., duration, start and end times, etc.) associated with the call; the data volume 214 of the call; and call termination and error codes 216. Each CDR 202, 204, 206 also comprises entries comprising partial network information such as (but not limited to) a source cell site identifier (ID) 218; and a destination cell site ID 220; the ID 222 of the SGSN that handled the call; and the ID 224 of the GGSN that handled the call. FIG. 2 also shows that a CDR can comprise information specific to the CDR itself such as (but not limited to) an ID 226 uniquely identifying the CDR and a time stamp 228 identifying when the CDR was generated. It should be noted that another example of a CDR format is provided by the 3GPP specification 32.297 (see 3gpp.org/ftp/Specs/html-info/32297.htm), which is hereby incorporated by reference.

The CDR analyzer 134 parses each of the CDRs 128 and passes relevant information to the pattern identifier 136. For example, the CDR analyzer 134 extracts the CDR ID 226, the CDR time stamp 228, the source ID 208, the destination ID 210, the termination codes 216, the source cell site ID 218, and the destination cell site ID 220 from the CDRs 128 and passes this information to the pattern identifier 136. The pattern identifier 136 analyzes this information for a plurality of the CDRs 128 to detect one or more call quality deterioration patterns. For example, the pattern identifier 136, in one embodiment, is configured to detect a pattern with the following characteristics: 1.) a sequence of CDRs 128 generated within a threshold-based period of time between the same phone numbers; 2.) where previous calls within the sequence have failed due to an abnormal termination; 3.) where subsequent calls connected to different base stations; and 4.) where the connectivity time at the base stations exceeds a threshold (to rule out the possibility of mobility). It should be noted that other call quality deterioration patterns are applicable as well.

In above example, the pattern identifier 136 identifies a sequence of CDRs based on the CDR identifier associated with each CDR, where a sequence of CDRs has sequential identifiers. In another embodiment, a sequence of CDRs is a set of CDRs where of the CDRs were generated within a threshold amount of time with respect to each other. The pattern identifier 136 determines that a given sequence of CDRs was generated within the threshold-based period of time between the same phone numbers based on the timestamp associated with each CDR and the source and destination identifiers within each of the CDRs in the sequence of CDRs. For example, if the threshold is a 5-minute interval each of the sequence of CDRs is generated within 5-minutes of each other and each of the sequence of CDRs comprises the same source and destination identifiers (i.e., source phone number and destination phone number). The pattern identifier 136 determines if calls within the sequence have failed due to an abnormal termination based on the termination codes within each of the sequence of CDRs. For example, the pattern identifier 136 analyzes the termination/failure codes within each CDR and determines if the codes indicate an abnormal termination.

In one embodiment, the pattern identifier 136 then determines if subsequent calls in the sequence were connected to different base stations based on the source cell site ID and/or destination cell site ID information within each CDR. For example, the pattern identifier 136 analyzes the CDR information of a given CDR sequence to determine if the source cell site ID and/or destination cell site ID is different for one or more CDRs that were generated after the set of CDRs in the sequence of CDRs for which abnormal termination codes were identified. The pattern identifier 136 determines if the connectivity time at this new base station(s) exceeds a threshold (to rule out the possibility of mobility based on base station connectivity information within each CDR. If so, the NMS 126 determines that a connectivity issue was experienced by the UEs 108 associated with sequence of CDRs.

Another example of a connectivity pattern detectable by the pattern identifier 136 comprises the following aspects 1.) a sequence of CDRs generated within a threshold-based period of time between the same phone numbers; and 2.) where subsequent CDRs in the sequence indicate handoffs occurred to different base stations that are physically separated by a threshold distance. This threshold distance, in one embodiment, is large enough such that the handoffs could not be a result of user mobility within the period of time that the sequence of CDRs was generated. In this example, the pattern identifier 136 determines that a handoff occurred based on changes in the source cell site ID and/or destination cell site ID from one CDR in the sequence to another CDR in the sequence.

The pattern identifier 136, in one embodiment, determines that the two base stations involved in a handoff are separated by a threshold distance based on location information (e.g., global positioning system (GPS) information) associated with each of the base stations. In one embodiment, location information for a base station can be included within the CDRs 128, in an external inventory database, and/or the like. It should be noted that instead of determining if the two base stations are separated by a threshold distance, the pattern identifier 136 can determine if the base stations involved in a handoff are separated by a threshold number base stations. In one embodiment, this threshold number of base stations is counted based on the number of the source cell site ID and/or destination cell site ID changes between CDRs.

One additional example of a connectivity pattern detectable by the pattern identifier 136 comprises the following characteristics: 1.) a sequence of CDRs 128 generated within a threshold-based period of time between the same phone numbers; and 2.) where the sequence of CDRs indicate that the calls associated therewith switched back and forth (e.g., Ping-Pong effect) between the same set of base stations. In one embodiment, the pattern identifier 136 determines that the calls associated with the sequence of CDRs switched between the same set of base stations by identifying the source cell site ID and/or destination cell site ID between each CDR. It should be noted that the above examples are non-limiting and the pattern identifier 136 can be configured to detect various other connectivity patterns from CDRs 128 that indicate call quality deterioration.

When the NMS 126 detects/determines that a given set of CDRs 128 comprises a call quality deterioration pattern, the connectivity localizer 132 identifies the location in the network where the call quality is deteriorating. For example, based on analyzing the CDRs 128 the pattern identifier 136 can determine that a given set of UE devices 108 within a given region, such as a location area code (LAC) or a small geographical area covering a given number of base stations (e.g., 8-10 base stations), is experiencing call quality/connectivity issues. Once the pattern identifier 136 makes this determination the connectivity localizer 132, in one embodiment, performs base station triangulation to identify the approximate geographical region that these UE devices 108 from which they are connecting to the network 102. The connectivity localizer 132 then stores the location of the connectivity issues, as determined by the triangulation operations, as localization information 130. The triangulation operation results in the computation of the approximate latitude and longitude of the location of the mobile device using one or more triangulation methods.

In another embodiment, the connectivity localizer 132 utilizes address information associated with the UEs 108, which correspond to the sequence of analyzed CDRs 128, to identify the location within the network 102 where connectivity problems are occurring. For example, if the pattern identifier 136 detects connectivity problems at a time of day when most users are at home the connectivity localizer 132 obtains the address associated with the users' accounts/profiles. The connectivity localizer 132 then derives the approximate location within the network 102 experiencing the connectivity problems based on these addresses through geo-mapping. The connectivity localizer 132 stores the location of the connectivity issues, as determined by the geo-mapping operations, as localization information 130. In one embodiment, the geo-mapping operations convert the physical address associated with a user(s) to a GPS location including an approximate latitude and longitude.

In yet another embodiment, when the pattern identifier 136 detects connectivity problems occurring within the network 102 the connectivity localizer 132 sends a message (or instructs one or more other network elements to send a message) to one or more of the users experiencing the connectivity problem. For example, the connectivity localizer 132, in one embodiment, obtains the address/number of the UEs 108 experiencing problems from the CDR information analyzed by the pattern identifier 126. The connectivity localizer 132 then sends a message such as (but not limited to) a Short Message Service (SMS) message to the UEs 108 prompting the users to provide the address (or other location information) where they experienced connectivity issues/problems. The connectivity localizer 132 utilizes this address information provided by the users to locate the area within the network experiencing problems. The connectivity localizer 132 then stores the location of the connectivity issues, as determined by the above operations, as localization information 130.

Once the connectivity localizer 132 identifies the areas/regions of the network 102 experiencing connectivity issues, the connectivity monitor 131 and/or network operators can prioritize these areas/regions for resolving these issues. For example, the connectivity monitor 131 and/or network operators can rank the regions by weighing the percentage of calls facing deterioration. Such identification and ranking of possible geographical regions can help network-planning divisions to focus their attention on specific buildings in those regions. In an urban environment, this allows network operators to proactively identify the buildings where planned network growth or network adjustment is required. In another embodiment, the problematic regions that are affecting high average revenue per user (ARPU) customers are prioritized. This prioritization can be done, for example, by identifying affected customers of these regions based upon CDR fields and looking up the customer ARPU (or lifetime value) of these customers. The ARPUs are summed up and the clusters are ordered based upon the sum-ARPU or sum-lifetime-value affected.

Operational Flow Diagrams

Figure 3:
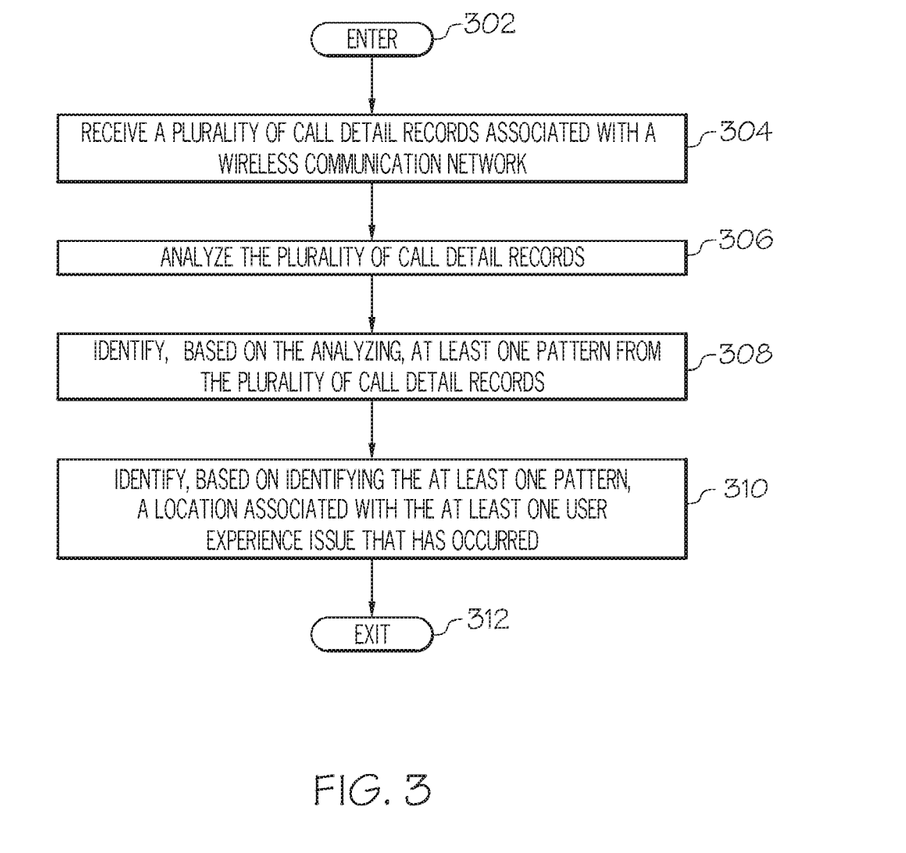
FIG. 3 is an operational flow diagram illustrating one example of managing service issues in a wireless communication network according to one embodiment of the present invention.

FIG. 3 is an operational flow diagram illustrating one example of managing service issues in a wireless communication network. The operational flow diagram of FIG. 3 begins at step 302 and flows directly to step 304. The NMS 126, at step 304, receives a plurality of CDRs 128 associated with a wireless communication network 102. The NMS 126, at step 306, analyzes the plurality of CDRs 128. The NMS 126, at step 308, identifies at least one pattern from the plurality of CDRs 128 based analyzing the plurality of CDRs 128. The at least one pattern indicates at least one service issue occurred during a set of calls associated with each of the plurality of CDRs 128. The NMS 126, at step 310, identifies a location associated with the at least one service issue that has occurred based on identifying the at least one pattern. The control flow exits at step 312.

Information Processing System

Figure 4:
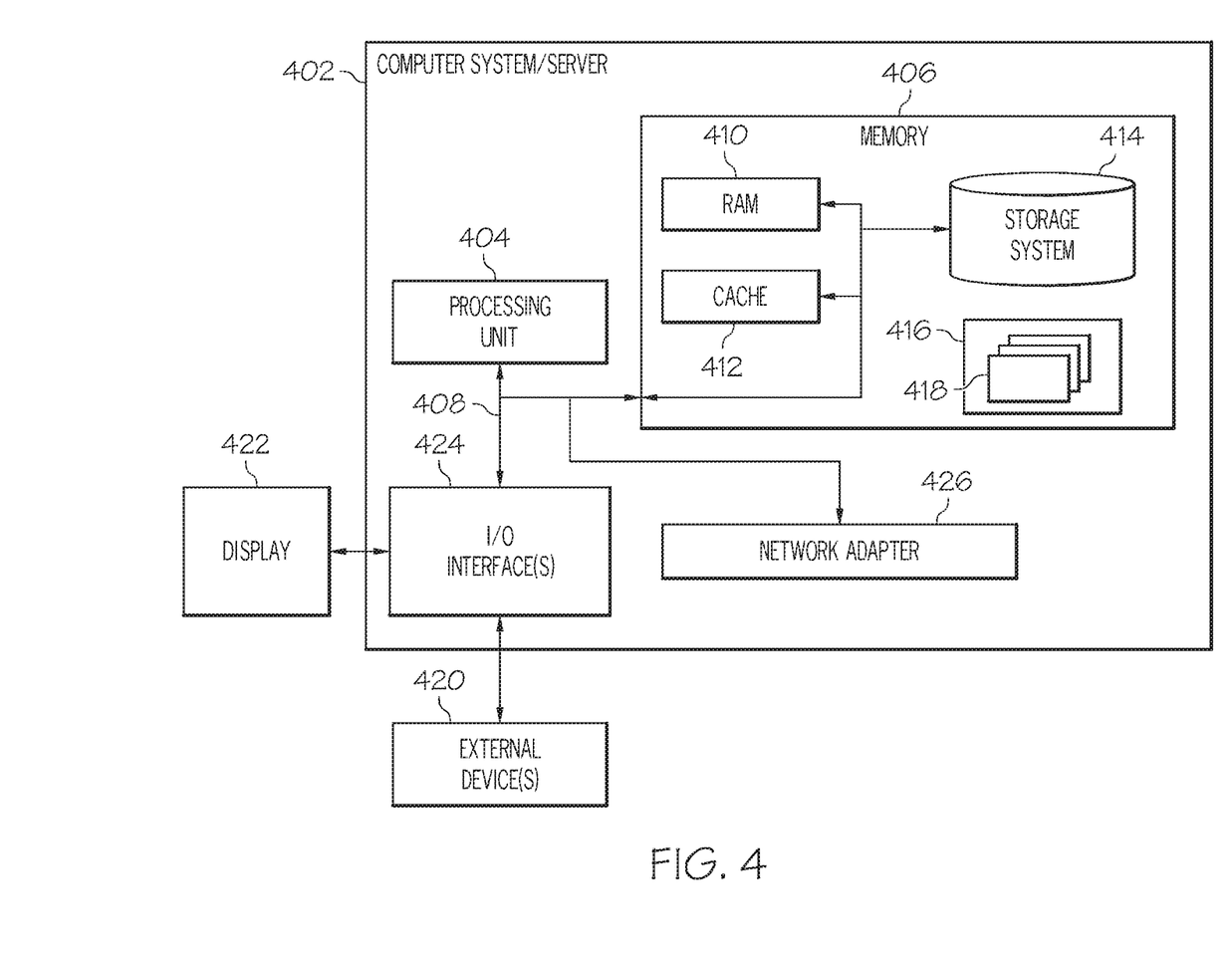
FIG. 4 is a block diagram illustrating one example of an information processing system according to one embodiment of the present invention.

Referring now to FIG. 4, this figure is a block diagram illustrating an information processing system that can be utilized in various embodiments of the present invention. The information processing system 402 is based upon a suitably configured processing system configured to implement one or more embodiments of the present invention. Any suitably configured processing system can be used as the information processing system 402 in embodiments of the present invention. The components of the information processing system 402 can include, but are not limited to, one or more processors or processing units 404, a system memory 406, and a bus 408 that couples various system components including the system memory 406 to the processor 404.

The bus 408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 4, the main memory 406 includes at least the NMS 126 and its components shown in FIG. 1. Each of these components can reside within the processor 404, or be a separate hardware component. The system memory 406 can also include computer system readable media in the form of volatile memory, such as random access memory (RAM) 410 and/or cache memory 412. The information processing system 402 can further include other removable/non-removable, volatile/non-volatile computer system storage media. By way of example only, a storage system 414 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 408 by one or more data media interfaces. The memory 406 can include at least one program product having a set of program modules that are configured to carry out the functions of an embodiment of the present invention.

Program/utility 416, having a set of program modules 418, may be stored in memory 406 by way of example, and not limitation, as well as an operating system, one or more application programs, other program modules, and program data. Each of the operating system, one or more application programs, other program modules, and program data or some combination thereof, may include an implementation of a networking environment. Program modules 418 generally carry out the functions and/or methodologies of embodiments of the present invention.

The information processing system 402 can also communicate with one or more external devices 420 such as a keyboard, a pointing device, a display 422, etc.; one or more devices that enable a user to interact with the information processing system 402; and/or any devices (e.g., network card, modem, etc.) that enable computer system/server 402 to communicate with one or more other computing devices. Such communication can occur via I/O interfaces 424. Still yet, the information processing system 402 can communicate with one or more networks such as a local area network (LAN), a general wide area network (WAN), and/or a public network (e.g., the Internet) via network adapter 426. As depicted, the network adapter 426 communicates with the other components of information processing system 402 via the bus 408. Other hardware and/or software components can also be used in conjunction with the information processing system 402. Examples include, but are not limited to: microcode, device drivers, redundant processing units, external disk drive arrays, RAID systems, tape drives, and data archival storage systems.

Non-Limiting Examples

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, by an information processing system, for managing service issues in a wireless communication network, the method comprising:
   electronically communicating, by the information processing system, with at least one additional information processing system, the at least one additional information processing system monitoring wireless service usage of a plurality of wireless communication devices within a wireless communication network and generating a plurality of call detail records representing the wireless service usage of the plurality of wireless communication devices;
   obtaining, by the information processing system, the plurality of call detail records from the at least one additional information processing system based on the electronic communication therewith;
   storing, by the information processing system, the plurality of call detail records in memory;
   analyzing, by the information processing system, the plurality of call detail records stored in the memory;
   identifying, by the information processing system based on the analyzing, at least one pattern from the plurality of call detail records, wherein the at least one pattern indicates at least one service issue occurred during a set of calls associated with each of the plurality of call detail records, wherein identifying the at least one pattern comprises
   identifying a sequence of call detail records from the plurality of call detail records, wherein each of the sequence of call detail records was generated within a threshold interval of time,
   determining that each of the sequence of call detail records is associated with a matching source address and a matching destination address,
   determining that each of a first subset of the sequence of call detail records indicates that a corresponding call failed, and
   determining that each of a second subset of the sequence of call detail records indicates that a communication link for a corresponding call was established with at least one base station that is different than a base station identified by each of the first subset of the sequence of call detail records, wherein the second subset of the sequence of call detail records were generated subsequent to the first subset of the sequence of call detail records;
   identifying, by the information processing system based on identifying the at least one pattern, a location associated with the at least one service issue that has occurred; and
   storing, by the information processing system, the location associated with the at least one service issue that has occurred in the memory.

2. The method of claim 1, wherein identifying the at least one pattern further comprises:
   determining that at least two of the sequence of call detail records identify a first base station, and at least one of the sequence of call detail records identify a second base station, wherein the first base station is different than the second base station.

3. The method of claim 1, wherein identifying the location comprises:
   identifying a base station associated with each of the plurality of call detail records
   performing one or more triangulation operations based on each of the base stations that have been identified.

4. The method of claim 1, wherein identifying the location comprises:
   obtaining a subscriber profile associated with each of the plurality of call detail records;
   identifying an address associated with each of the subscriber profiles; and
   determining the location associated with the at least one service issue based on the addresses that have been identified.

5. The method of claim 1, wherein identifying the location comprises:
   prompting, based on identifying the at least one pattern, at least one user associated with the plurality of call detail records to provide an address where the at least one service issue occurred.

6. The method of claim 1, wherein the at least one service issue indicates that a plurality of different users experienced different levels of call quality within a given area of the wireless communication network.

7. The method of claim 1, wherein identifying the at least one pattern comprises:
   determining that at least a first base station identified by at least a first of the sequence of call detail records is different than at least a second base station identified by at least a second of the sequence of call detail records, and that at least a third base station identified by at least third of the sequence of call detail records is the same as the first base station.

8. An information processing system for managing service issues in a wireless communication network, the information processing system comprising:
   a memory;

a processor communicatively coupled to the memory; and
a network monitoring system communicatively coupled to the memory and the processor, wherein the network monitoring system is configured to perform a method comprising:
electronically communicating with at least one additional information processing system, the at least one additional information processing system monitoring wireless service usage of a plurality of wireless communication devices within a wireless communication network and generating a plurality of call detail records representing the wireless service usage of the plurality of wireless communication devices;
obtaining the plurality of call detail records from the at least one additional information processing system based on the electronic communication therewith;
storing the plurality of call detail records in the memory;
analyzing the plurality of call detail records stored in the memory;
identifying, based on the analyzing, at least one pattern from the plurality of call detail records, wherein the at least one pattern indicates at least one service issue occurred during a set of calls associated with each of the plurality of call detail records, wherein identifying the at least one pattern comprises
identifying a sequence of call detail records from the plurality of call detail records, wherein each of the sequence of call detail records was generated within a threshold interval of time,
determining that each of the sequence of call detail records is associated with a matching source address and a matching destination address,
determining that each of a first subset of the sequence of call detail records indicates that a corresponding call failed, and
determining that each of a second subset of the sequence of call detail records indicates that a communication link for a corresponding call was established with at least one base station that is different than a base station identified by each of the first subset of the sequence of call detail records, wherein the second subset of the sequence of call detail records were generated subsequent to the first subset of the sequence of call detail records;
identifying based on identifying the at least one pattern, a location associated with the at least one service issue that has occurred; and
storing the location associated with the at least one service issue that has occurred in the memory.

9. The information processing system of claim 8, wherein identifying the at least one pattern comprises:
determining that at least two of the sequence of call detail records identify a first base station, and at least one of the sequence of call detail records identify a second base station, wherein the first base station is different than the second base station.

10. A non-transitory computer program storage product for managing service issues in a wireless communication network, the non-transitory computer program storage product comprising instructions executable by an information processing system to perform a method comprising:
electronically communicating, by the information processing system, with at least one additional information processing system, the at least one additional information processing system monitoring wireless service usage of a plurality of wireless communication devices within a wireless communication network and generating a plurality of call detail records representing the wireless service usage of the plurality of wireless communication devices;
obtaining, by the information processing system, the plurality of call detail records from the at least one additional information processing system based on the electronic communication therewith;
storing, by the information processing system, the plurality of call detail records in memory;
analyzing, by the information processing system, the plurality of call detail records stored in the memory;
identifying, by the information processing system based on the analyzing, at least one pattern from the plurality of call detail records, wherein the at least one pattern indicates at least one service issue occurred during a set of calls associated with each of the plurality of call detail records, wherein identifying the at least one pattern comprises
identifying a sequence of call detail records from the plurality of call detail records, wherein each of the sequence of call detail records was generated within a threshold interval of time,
determining that each of the sequence of call detail records is associated with a matching source address and a matching destination address,
determining that each of a first subset of the sequence of call detail records indicates that a corresponding call failed, and
determining that each of a second subset of the sequence of call detail records indicates that a communication link for a corresponding call was established with at least one base station that is different than a base station identified by each of the first subset of the sequence of call detail records, wherein the second subset of the sequence of call detail records were generated subsequent to the first subset of the sequence of call detail records;
identifying, by the information processing system based on identifying the at least one pattern, a location associated with the at least one service issue that has occurred; and
storing, by the information processing system, the location associated with the at least one service issue that has occurred in the memory.

11. The non-transitory computer program storage product of claim 10, wherein identifying the at least one pattern comprises:
identifying a sequence of call detail records from the plurality of call detail records, wherein each of the sequence of call detail records was generated within a threshold interval of time; and
determining that at least two of the sequence of call detail records identify a first base station, and at least one of the sequence of call detail records identify a second base station, wherein the first base station is different than the second base station.

12. The non-transitory computer program storage product of claim 10, wherein identifying the location comprises:
identifying a base station associated with each of the plurality of call detail records
performing one or more triangulation operations based on each of the base stations that have been identified.

13. The non-transitory computer program storage product of claim 10, wherein identifying the location comprises:
obtaining a subscriber profile associated with each of the plurality of call detail records;

identifying an address associated with each of the subscriber profiles; and determining the location associated with the at least one service issue based on the addresses that have been identified.

* * * * *